US008627786B2

(12) United States Patent
Arthur (10) Patent No.: US 8,627,786 B2
(45) Date of Patent: Jan. 14, 2014

(54) PET FEEDING APPARATUS

(76) Inventor: Peters Arthur, Bexley Heath (GB)

( * ) Notice: Subject to any disclaimer, the term of this patent is extended or adjusted under 35 U.S.C. 154(b) by 0 days.

(21) Appl. No.: 13/109,772

(22) Filed: May 17, 2011

(65) Prior Publication Data

US 2012/0285385 A1 Nov. 15, 2012

Related U.S. Application Data

(60) Provisional application No. 61/484,344, filed on May 10, 2011.

(51) Int. Cl.
*A01K 1/00* (2006.01)
*A01K 5/00* (2006.01)
*A01K 39/00* (2006.01)

(52) U.S. Cl.
USPC .................... 119/51.11; 119/51.02; 119/61.5

(58) Field of Classification Search
USPC ............ 119/51.11, 51.01, 51.5, 61.5, 53, 63, 119/900, 51.02, 51.12–15.15, 57.92; 222/650; 177/25.16, 126, 238, 244; D30/122, 121, 129, 133
See application file for complete search history.

(56) References Cited

U.S. PATENT DOCUMENTS

| | | | | |
|---|---|---|---|---|
| 1,703,639 A | * | 2/1929 | Samuelson | 177/230 |
| 4,079,699 A | | 3/1978 | Longmore | |
| 4,426,956 A | * | 1/1984 | McKinstry | 119/72 |
| 4,722,300 A | * | 2/1988 | Walker et al. | 119/51.11 |
| 4,893,686 A | * | 1/1990 | Chretien et al. | 177/180 |
| 5,239,943 A | * | 8/1993 | Kim | 119/51.12 |
| 5,299,529 A | * | 4/1994 | Ramirez | 119/51.11 |
| 5,433,171 A | * | 7/1995 | Ewell | 119/51.5 |
| 6,318,291 B1 | * | 11/2001 | Wolanski | 119/61.5 |
| 6,367,417 B1 | * | 4/2002 | Gal et al. | 119/51.5 |
| 6,600,110 B1 | * | 7/2003 | Thadani et al. | 177/126 |
| 6,904,868 B2 | * | 6/2005 | Block et al. | 119/51.12 |
| 7,832,355 B2 | * | 11/2010 | Mills | 119/51.02 |
| 8,148,651 B1 | * | 4/2012 | Coppola | 177/25.16 |
| 2002/0124017 A1 | * | 9/2002 | Mault | 707/509 |
| 2004/0118618 A1 | * | 6/2004 | Davidson et al. | 177/25.13 |
| 2005/0150696 A1 | * | 7/2005 | Zhou | 177/25.16 |
| 2005/0184148 A1 | * | 8/2005 | Perlman | 235/383 |
| 2005/0252457 A1 | * | 11/2005 | Morosin et al. | 119/51.13 |
| 2007/0181068 A1 | * | 8/2007 | McKeown | 119/51.02 |
| 2007/0215055 A1 | * | 9/2007 | Larose et al. | 119/51.02 |
| 2008/0019122 A1 | * | 1/2008 | Kramer | 362/154 |
| 2008/0245580 A1 | * | 10/2008 | Aby-Eva et al. | 177/25.12 |
| 2008/0252464 A1 | * | 10/2008 | Panasevich | 340/573.1 |
| 2009/0173282 A1 | * | 7/2009 | Wu et al. | 119/51.02 |
| 2009/0255474 A1 | * | 10/2009 | Gleesing | 119/51.04 |
| 2010/0038149 A1 | * | 2/2010 | Corel | 177/25.16 |
| 2010/0263596 A1 | * | 10/2010 | Schumann et al. | 119/51.02 |
| 2010/0332140 A1 | * | 12/2010 | Joyce et al. | 702/19 |
| 2011/0168456 A1 | * | 7/2011 | Sharawi et al. | 177/25.16 |
| 2011/0297456 A1 | * | 12/2011 | Davidson et al. | 177/1 |
| 2012/0199076 A1 | * | 8/2012 | Biede et al. | 119/51.02 |

FOREIGN PATENT DOCUMENTS

GB 2465569 5/2010
JP 2002300824 10/2002

* cited by examiner

*Primary Examiner* — Andrea Valenti (57) ABSTRACT

A pet feeding apparatus includes a container and a base assembly, wherein the base assembly includes a sensor assembly operatively coupled to a portion keypad circuit board and operation keypad circuit board. The base assembly displays an indication of the amount of food carried by the container, and the base assembly provides an indication of the feeding time.

18 Claims, 8 Drawing Sheets

PET FEEDING APPARATUS

CROSS-REFERENCE TO RELATED APPLICATIONS

This patent application claims priority to U.S. Provisional Application No. 61/484,344 filed on May 10, 2011, the contents of which are incorporated by reference as though fully set forth herein.

BACKGROUND OF THE INVENTION

1. Field of the Invention

This invention relates generally to pets and, more particularly, to the feeding of pets.

2. Description of the Related Art

It is desired to control the feeding of a pet, such as a dog, so that the pet receives enough food to live a healthy lifestyle, but is not overfed so that it becomes obese. It is often difficult to control the amount of food the pet receives because it can be fed by many different people in a family environment. For example, one family member can feed the pet without knowing that the pet was just fed by another family member. Further, one family member can decide to not feed the pet because of the mistaken believe that the pet was fed by another family member. As it can be appreciated, it is difficult to keep track of who has fed the pet on a daily basis. Further, it is difficult to keep track of how much food the pet received at a particular time.

Some pet feeding systems are disclosed by U.S. Pat. No. 4,079,699 to Longmore, as well as Great Britain Patent Nos. GB2465589 to Peters and GB900339 to Chambrier. Another pet feeding system is disclosed in Japanese Patent No. JP2002300824 to Yokoyama.

BRIEF SUMMARY OF THE INVENTION

The present invention is directed to a pet feeding apparatus. The novel features of the invention are set forth with particularity in the appended claims. The invention will be best understood from the following description when read in conjunction with the accompanying drawings.

DETAILED DESCRIPTION OF THE INVENTION

Figure 1A:
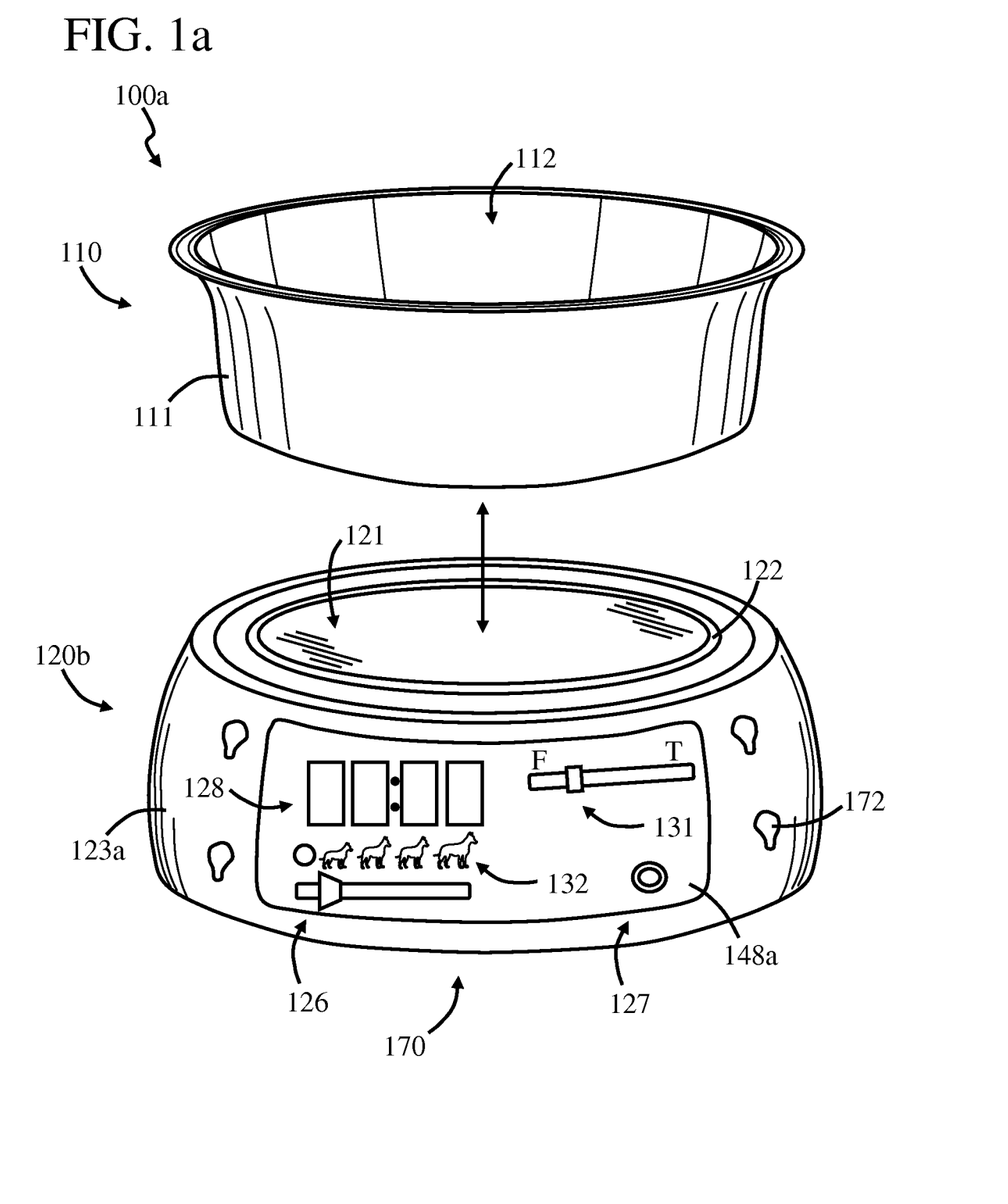
FIGS. 1a and 1b are perspective views of one embodiment of a pet feeding apparatus.
Figure 1B:
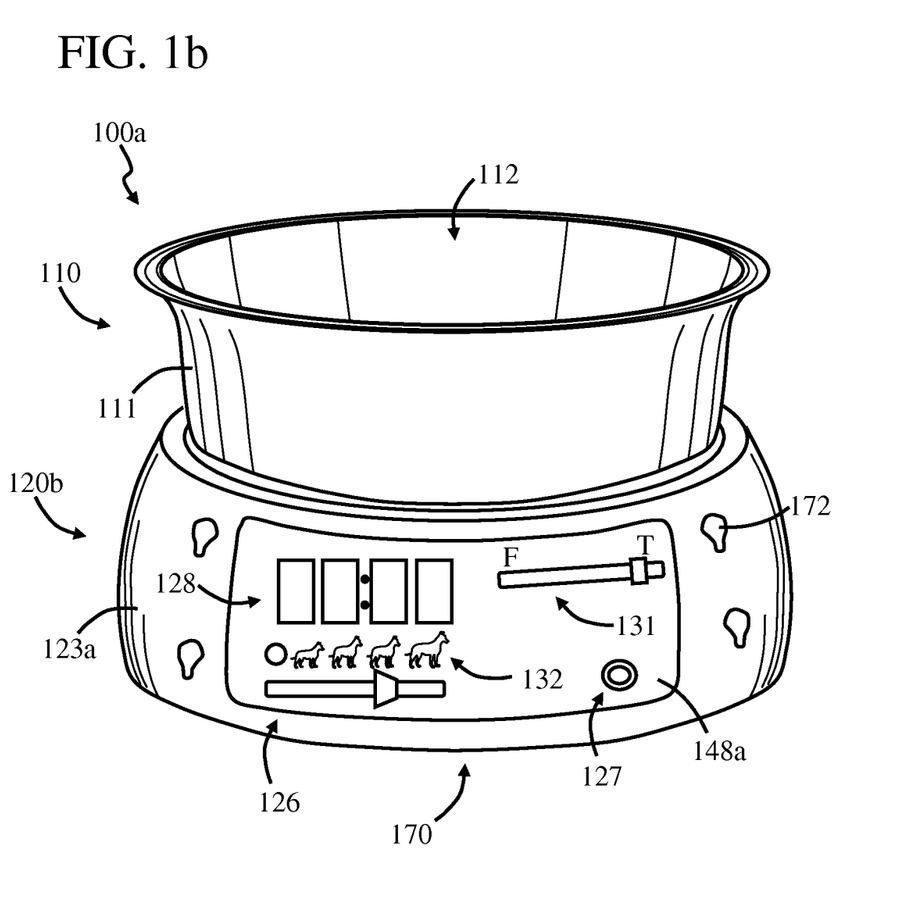

FIGS. 1a and 1b are perspective views of one embodiment of a pet feeding apparatus 100a. In this embodiment, pet feeding apparatus 100a includes a container 110 having a container body 111 and container body opening 112 extending therethrough. Container 110 can be of many different types of containers, such as a bowl. In this embodiment, container 110 is a bowl typically used to feed a pet, such as a dog.

In this embodiment, pet feeding apparatus 100a includes a base assembly 120b which supports container 110, as shown in FIG. 1b. Base assembly 120b includes a base body 123a with a support surface 121. Base assembly 120b includes an anti-slip ring 122 positioned on support surface 121. Anti-slip ring 122 restricts the ability of container 110 to move relative to support surface 121. Base assembly 120b includes a light 172 which is repeatably moveable between activated (on) and deactivated (off) conditions. Light 172 emits light and does not emit light in response to being activated and deactivated, respectively. In some embodiments, light 172 is activated in response to the amount of food being driven to a predetermined amount of food. In general, base assembly 120b includes one or more lights.

Figure 3A:
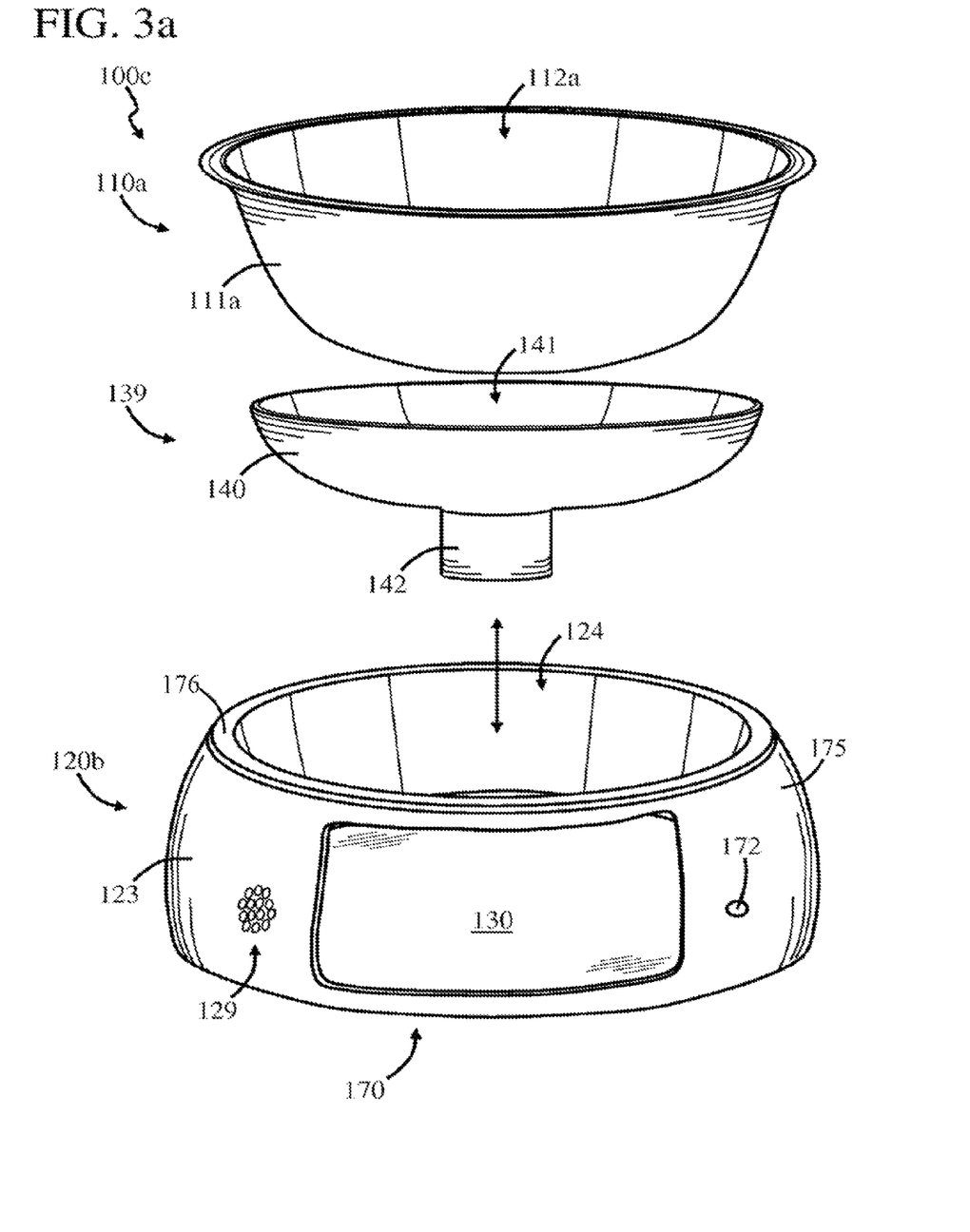
FIGS. 3a and 3b are perspective views of another embodiment of a pet feeding apparatus.

In some embodiments, such as the one shown in FIG. 3a, base assembly 120b includes a speaker 129. The operation of speaker 129 will be discussed in more detail below. In some embodiments, a sound is provided in response to the amount of food being driven to a predetermined amount of food. The sound is provided by speaker 129. In general, base assembly 120b includes one or more speakers.

In this embodiment, base assembly 120b includes a panel 148a which extends through a panel opening 130 (FIG. 3a) of base body 123a. Panel 148a includes a power switch 127, wherein base assembly 120b is in an activated and deactivated condition in response to activating and deactivating power switch 127, respectively.

Panel 148a includes a timer display 128, which displays a time, and a slideable operation selector 131, which controls the operation of base assembly 120b. Panel 148a includes a slideable portion selector 126, which is set to select a portion size it is desired to feed a pet, such as a dog. Panel 148a includes portion symbols 132, which are used to indicate the portion sizes.

Figure 1C:
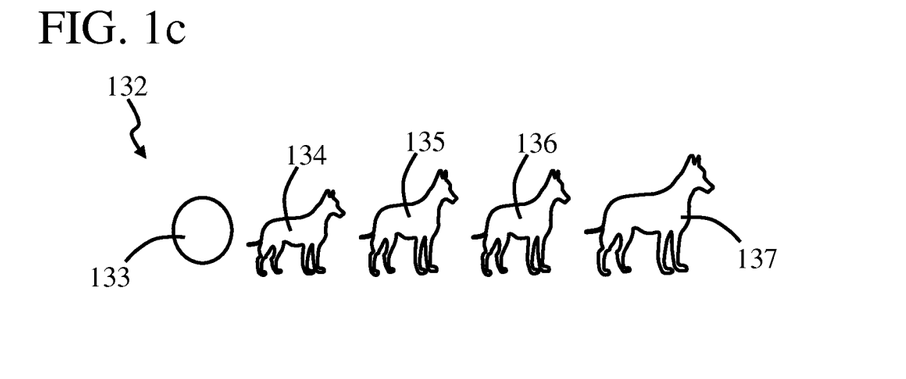
FIG. 1c is a close-up view of portion symbols of the pet feeding apparatus of FIGS. 1a and 1b.

FIG. 1c is a close-up view of portion symbols 132 of pet feeding apparatus 100a. Portion symbols 132 can include many different symbols, such as an emblem of a dog, as shown. In this embodiment, portion symbols 132 include a neutral calibration position 133, a puppy emblem 134, a small dog emblem 135, a medium dog emblem 136 and a large dog emblem 137, so that there are four portion sizes. It should be noted, however, that base assembly 120b can be set to fewer or more portion sizes. In general, base assembly 120b can be set to one or more portion sizes, and the example of four portion sizes is for illustrative purposes.

It should also be noted that slideable portion selector 126 is proximate to puppy emblem 134 in FIG. 1a to indicate a portion size for a puppy, and slideable portion selector 126 is proximate to medium dog emblem 136 in FIG. 1b to indicate a portion size for a medium sized dog.

The portion sizes can correspond to many different sizes. In general, the portion sizes correspond to the recommended amount of food to be given to a pet of a given size. The recommendations are typically set forth by health standards determined by medical professionals, such as veterinarians.

Figure 2A:
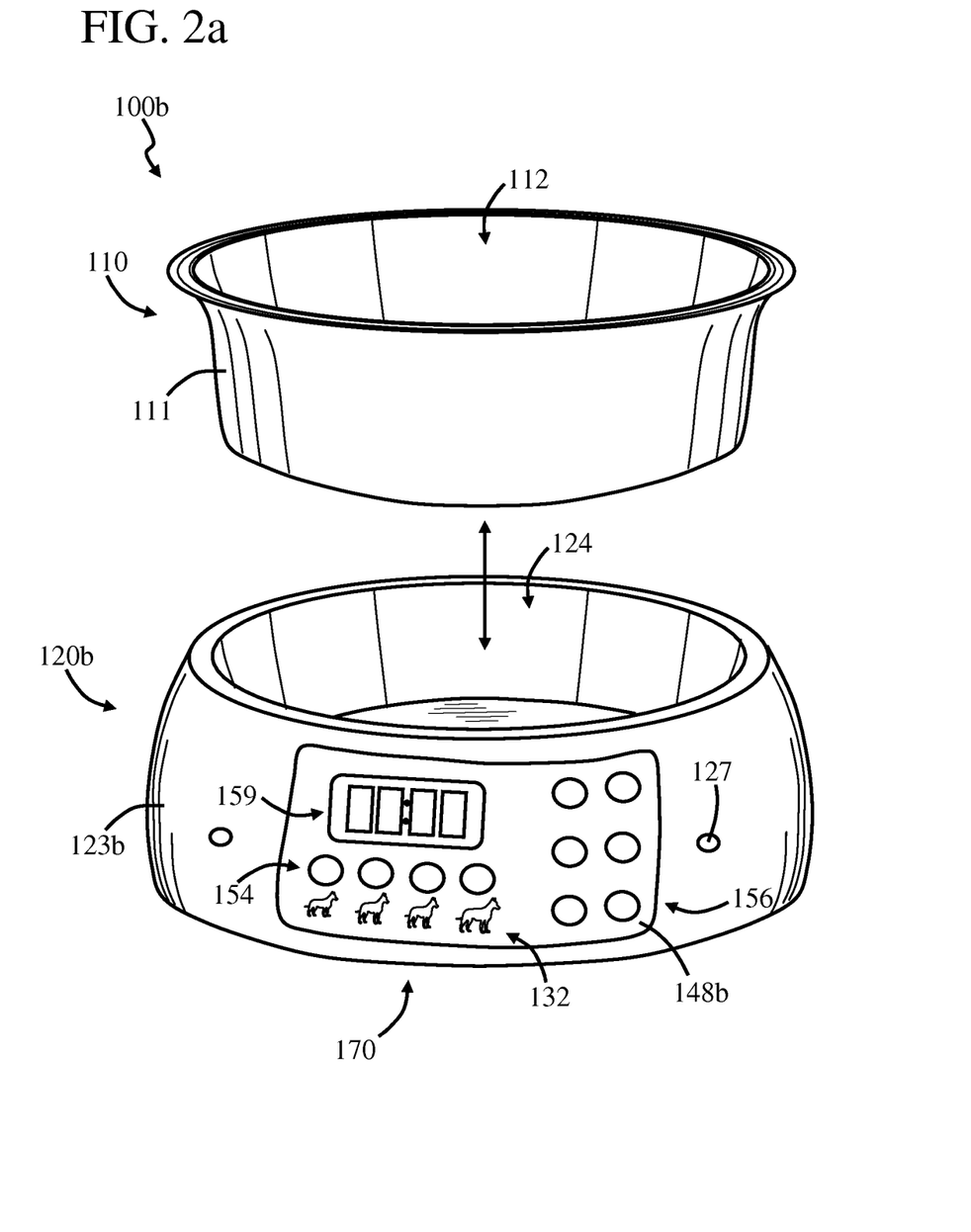
FIGS. 2a and 2b are perspective views of another embodiment of a pet feeding apparatus.
Figure 2B:
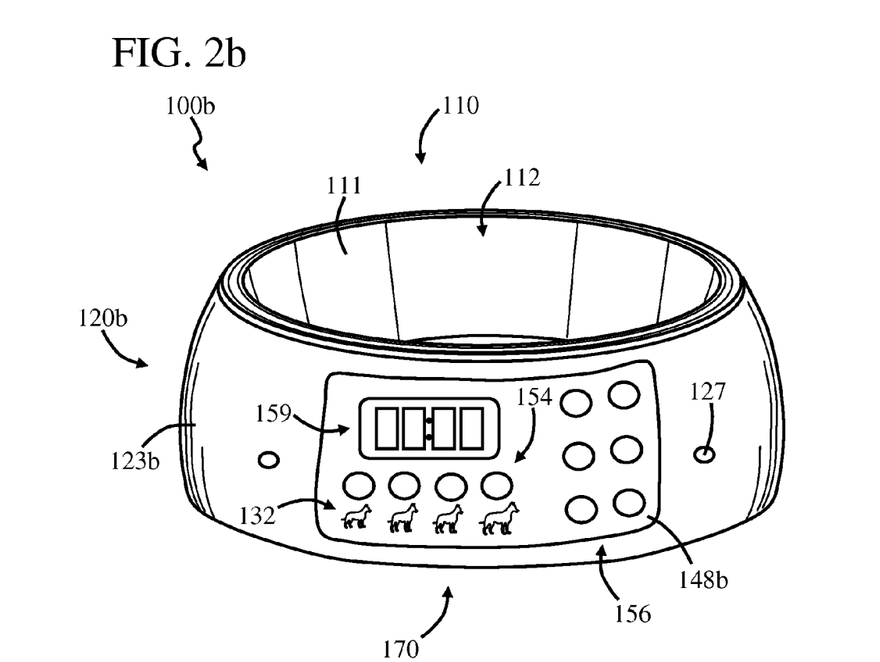

FIGS. 2a and 2b are perspective views of one embodiment of a pet feeding apparatus 100b. In this embodiment, pet feeding apparatus 100b includes container 110 having container body 111 and container body opening 112 extending therethrough. Container 110 is discussed in more detail above.

In this embodiment, pet feeding apparatus 100b includes a base assembly 120b which supports container 110, as shown in FIG. 2b. Base assembly 120b includes a base body 123b with a base opening 124 through which container 110 extends. Base assembly 120b includes a light 127 which is repeatably moveable between on and off conditions. Light 127 emits light and does not emit light in response to being on and off, respectively. In some embodiments, such as the one shown in FIG. 3a, base assembly 120b includes speaker 129. The operation of speaker 129 will be discussed in more detail below.

In this embodiment, base assembly 120b includes a panel 148b which extends through panel opening 130 (FIG. 3a) of base body 123b. Panel 148b includes a display 159 which displays information, such as a clock which operates as a timer.

Figure 2C:
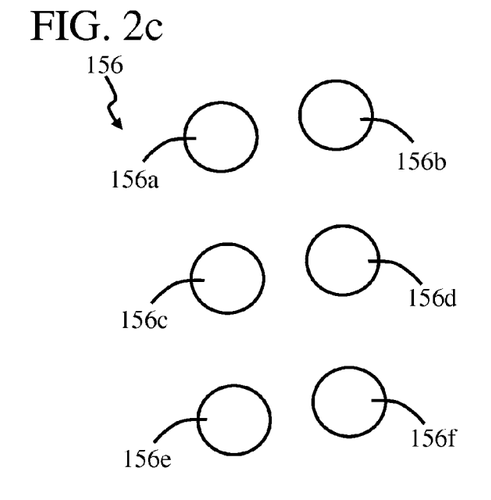
FIG. 2c is a close-up view of an operation button array of a pet feeding apparatus.

Panel 148b includes operation button array 156, as shown in FIG. 2c. In this embodiment, operation button array 156 includes a feeding button 156a which activates and deactivates a sensor assembly, as will be discussed in more detail below. Operation button array 156 includes a timer button 156b, which controls the operation of display 159. Operation button array 156 includes an hour button 156c, which sets the number of hours displayed by display 159. Operation button array 156 includes a minute button 156d, which sets the number of minutes displayed by display 159. Operation button array 156 includes an alarm button 156e, which sets an alarm of pet feeding apparatus 100b. Operation button array 156 includes a set button 156f, which sets a function of pet feeding apparatus 100b.

Figure 2D:
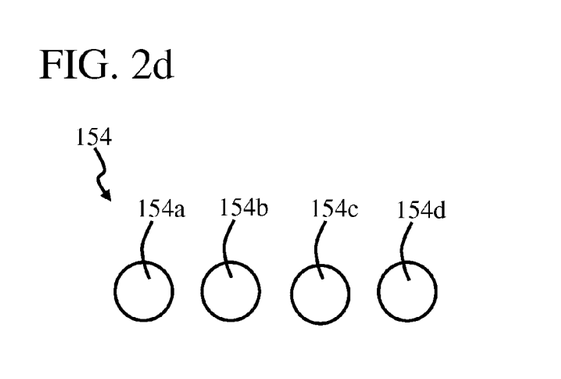
FIG. 2d is a close-up view of a portion button array of a pet feeding apparatus.

In this embodiment, base assembly 120b includes a portion button array 154, as shown in FIG. 2d. Portion buttons array 154 is positioned proximate to portion symbols 132, which are discussed in more detail above. Portion button array 154 includes a portion button 154a positioned proximate to puppy emblem 134, wherein portion button 154a is activated to indicate a portion size for a puppy. Portion button array 154 includes a portion button 154b positioned proximate to small dog emblem 135, wherein portion button 154b is activated to indicate a portion size for a small dog. Portion button array 154 includes a portion button 154c positioned proximate to medium dog emblem 136, wherein portion button 154c is activated to indicate a portion size for a medium dog. Portion button array 154 includes a portion button 154d positioned proximate to large dog emblem 137, wherein portion button 154d is activated to indicate a portion size for a large dog.

FIG. 3a is a perspective view of one embodiment of a pet feeding apparatus 100c. In this embodiment, pet feeding apparatus 100c includes container 110a having container body 111a and container body opening 112a extending therethrough. In this embodiment, container body 111a has a more rounded bottom portion than container body 111.

In this embodiment, pet feeding apparatus 100c includes container holder 139, which includes a container holder body 140 with a container holder opening 141 extending therethrough. Container holder body 140 includes a container holder leg 142, which extends away from container holder opening 141.

In this embodiment, pet feeding apparatus 100c includes base assembly 120b which supports container 110, as shown in FIG. 2b. Base assembly 120b includes a base body 123 with a base opening 124 through which container 110 extends. Base body 123 includes an annular sidewall 175. Annular sidewall 175 includes an upper annular lip 176 which bounds base opening 124. Base assembly 120b includes light 172 which is repeatably moveable between on and off conditions. Light 172 emits light and does not emit light in response to being on and off, respectively. In this embodiment, base assembly 120b includes speaker 129. As shown in FIG. 3a, base assembly 120b includes panel opening 130, which is sized and shaped to receive a panel, such as panels 148a and 148b (FIGS. 1a & 2a respectively).

In this embodiment FIG. 2b, base assembly 120b includes a panel 148b which extends through panel opening 130 (FIG. 3a) of base body 123. Panel 148b includes a display 159 which displays information, such as a clock which operates as a timer.

Panel 148b includes operation button array 156, as shown in FIG. 2c. In this embodiment, operation button array 156 includes a feeding button 156a which activates and deactivates a sensor assembly, as will be discussed in more detail below. Operation button array 156 includes a timer button 156b, which controls the operation of display 159. Operation button array 156 includes an hour button 156c, which sets the number of hours displayed by display 159. Operation button array 156 includes a minute button 156d, which sets the number of minutes displayed by display 159. Operation button array 156 includes an alarm button 156e, which sets an alarm of pet feeding apparatus 100c. Operation button array 156 includes a set button 156f, which sets a function of pet feeding apparatus 100c.

In this embodiment, base assembly 120b includes a portion button array 154, as shown in FIG. 2d. Portion button array 154 is positioned proximate to portion symbols 132, which are discussed in more detail above. Portion button array 154 includes a portion button 154a positioned proximate to puppy emblem 134 (FIG. 1c), wherein portion button 154a is activated to indicate a portion size for a puppy. Portion button array 154 includes a portion button 154b positioned proximate to small dog emblem 135, wherein portion button 154b is activated to indicate a portion size for a small dog. Portion button array 154 includes a portion button 154c positioned proximate to medium dog emblem 136, wherein portion button 154c is activated to indicate a portion size for a medium dog. Portion button array 154 includes a portion button 154d positioned proximate to large dog emblem 137, wherein portion button 154d is activated to indicate a portion size for a large dog.

Figure 3B:
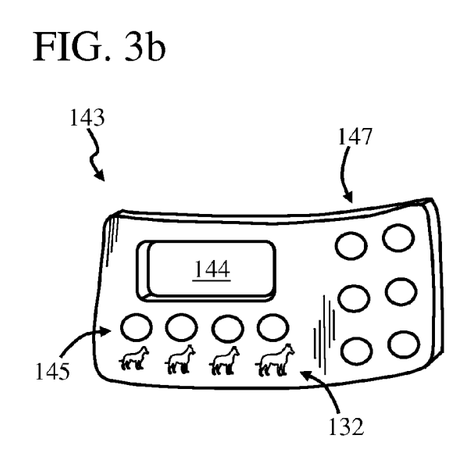

FIG. 3b is a perspective view of a panel sticker 143 of pet feeding apparatus 100c. In this embodiment, panel sticker 143 includes portion symbols 132 printed thereon, and a display opening 144 through which display 128 & 159 can be seen. Panel sticker 143 includes portion keypad openings 145 through which portion buttons array 154 extends. Further, panel sticker 143 includes operation keypad openings 147 through which operation button array 156 extends through.

Figure 3C:
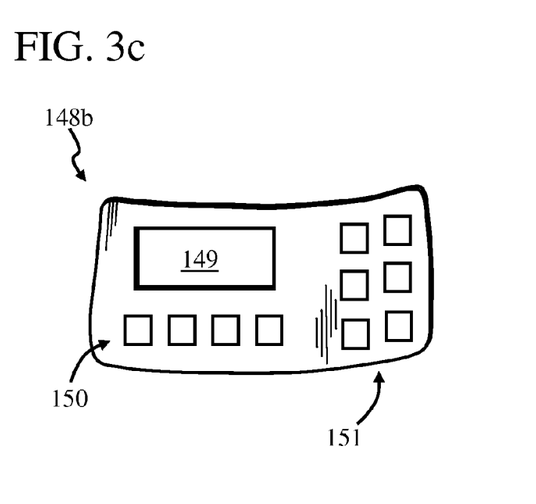
FIG. 3c is a perspective view of panel of a pet feeding apparatus.

FIG. 3c is a perspective view of panel 148b. In this embodiment, panel 148b includes a display opening 149 through which display 128 & 159 can be seen. In this embodiment, panel 148b includes portion keypad openings 150 through which portion buttons array 154 extends. Further, panel 148b includes operation keypad openings 151 through which operation button array 156 extends through.

Figure 3D:
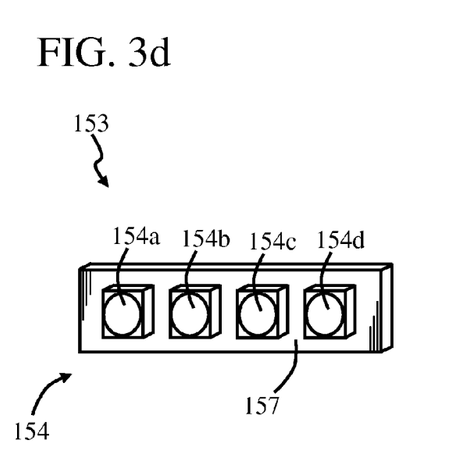
FIG. 3d is a perspective view of a portion keypad of a pet feeding apparatus.

FIG. 3d is a perspective view of a portion keypad 153 of pet feeding apparatus 100c, wherein portion keypad 153 includes portion button array 154 carried by a portion keypad circuit board 157.

Figure 3E:
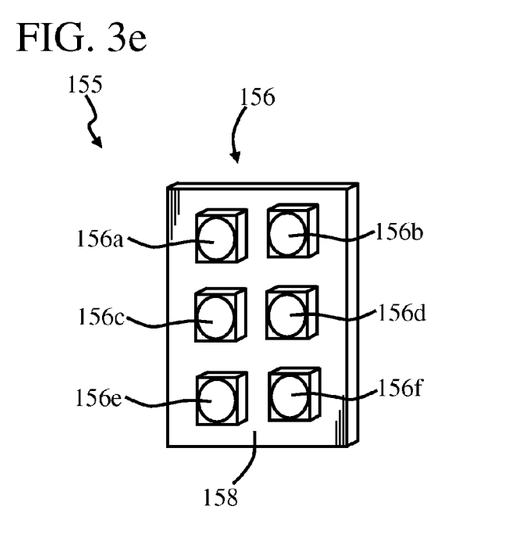
FIG. 3e is a perspective view of an operation keypad of a pet feeding apparatus.

FIG. 3e is a perspective view of a operation keypad 155 of pet feeding apparatus 100c, wherein operation keypad 155 includes operation button array 156 carried by an operation keypad circuit board 158.

Figure 3F:
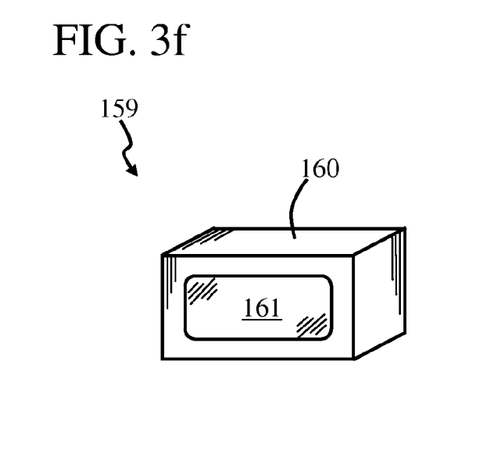
FIG. 3f is a perspective view of a display of a pet feeding apparatus.

FIG. 3f is a perspective view of display 159, wherein display 159 includes a display screen body 160 and display screen 161 for displaying information. The information displayed can be of many different types, such as information provided in response to the operation of operation keypad 155.

Figure 3G:
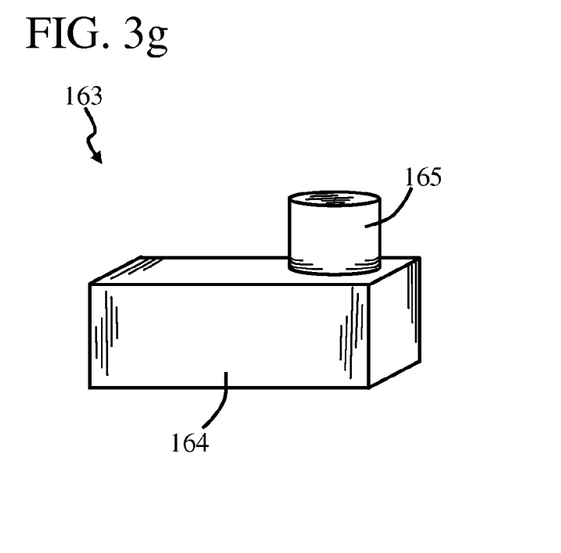
FIG. 3g is a perspective view of a sensor of a pet feeding apparatus.

FIG. 3g is a perspective view of a sensor 163, which can be included in the pet feeding apparatuses discussed above. In this embodiment, sensor 163 includes a sensor body 164 which carries a sensor leg 165. Sensor leg 165 is sized and shaped to be coupled to container holder leg 142. Sensor 163 can be of many different types. In this embodiment, sensor 163 includes a pressure sensitive material, wherein a resistance of the pressure sensitive material is adjustable in response to adjusting the amount of pressure applied to the pressure sensitive material. The pressure sensitive material can be positioned at many different locations of sensor 163. In one embodiment, the pressure sensitive material is carried by sensor leg 165. In another embodiment, the pressure sensitive material is carried by sensor body 164. In some embodiments, the pressure sensitive material is carried by sensor 163 and sensor body 164. The resistance of the pressure sensitive material is adjustable in response to adjusting the amount of food carried by container 110a. Some types of pressure sensitive materials are disclosed in U.S. Pat. Nos. 4,533,604, 4,684,481, 4,774,023, 5,229,037, 6,652,968, the contents of which are incorporated by reference as though fully set forth herein. Some types of pressure sensors are disclosed in U.S. Pat. Nos. 5,045,829, 5,090,246, 5,948,990, and 6,694,820, the contents of which are incorporated by reference as though fully set forth herein.

Figure 3H:
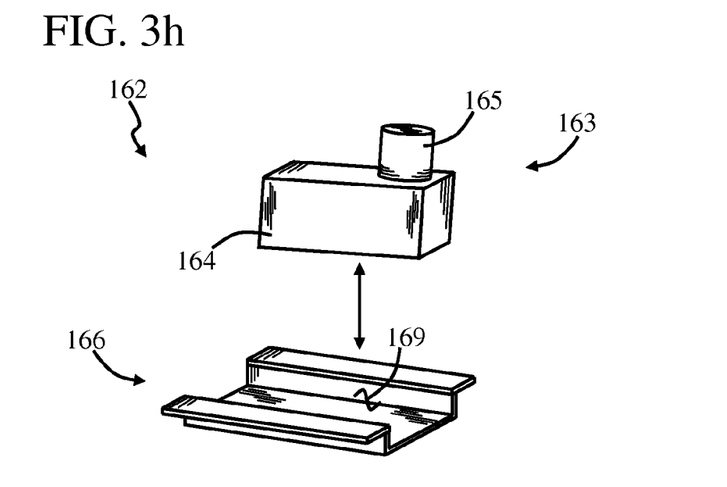
FIG. 3h is a perspective view of a sensor assembly of a pet feeding apparatus.

FIG. 3h is a perspective view of a sensor assembly 162, which can be included in the pet feeding apparatuses discussed above. In this embodiment, sensor assembly 162 includes sensor 163 and a sensor bracket 166. Sensor bracket 166 includes a sensor bracket slot 169, which extends between sensor bracket flanges 167 and 168 (not shown on diagram). Sensor bracket slot 169 is sized and shaped to receive sensor body 164 between sensor bracket flanges 167 and 168. It should be noted that sensor assembly 162 is operatively coupled to at least some of the components discussed above, such as operation keypad 155.

Figure 3I:
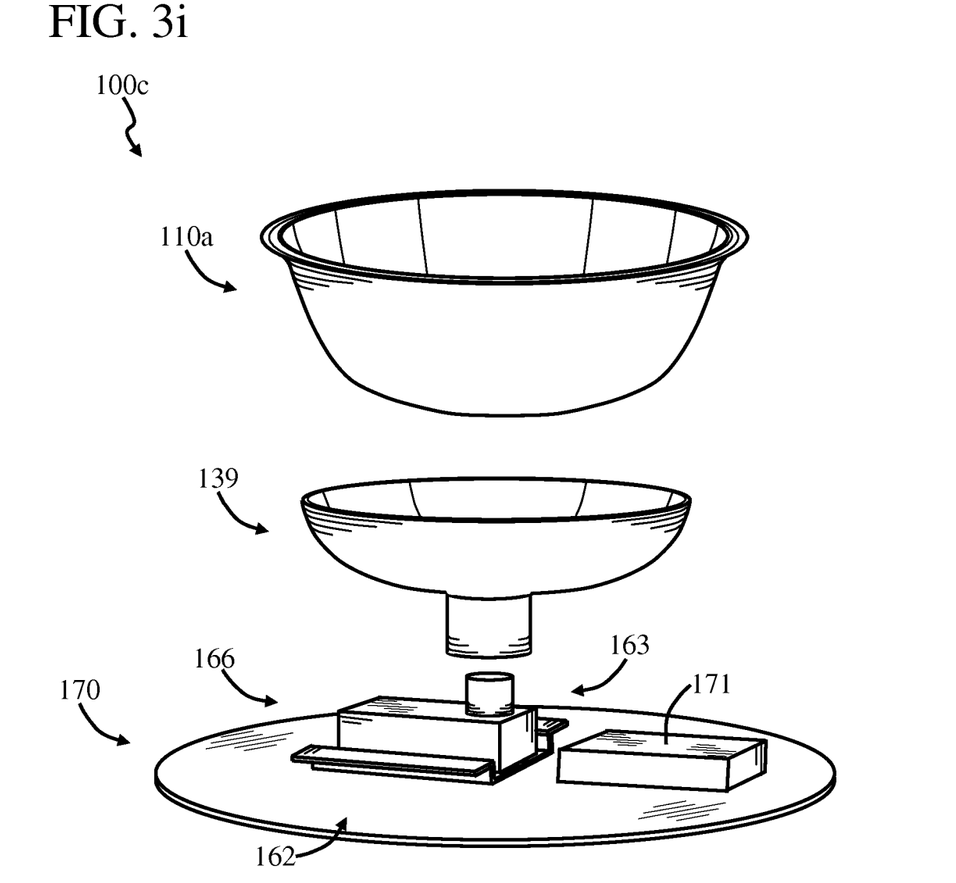
FIG. 3i is an exploded perspective view of a pet feeding apparatus.

FIG. 3i is an exploded perspective view of pet feeding apparatus 100c. It should be noted that the components of FIG. 3i can be included in any of the other pet feeding apparatuses disclosed herein. In this embodiment, pet feeding apparatus 100c includes a base plate 170, which carries a power compartment 171. Power compartment 171 houses a power source to provide power to the components of pet feeding apparatus 100c. The power source can be of many different types, such as a battery. In some embodiments, the power source is coupled to an external power supply, such as an electrical outlet.

Base plate 170 carries assembly 162, wherein sensor bracket 166 is positioned adjacent to power compartment 171 and sensor 163 is positioned on sensor bracket 166. Container holder 139 is coupled to sensor 163, and container 110a is carried by container holder 139.

In operation, the pet feeding apparatus includes an inner removable bowl and housing with a sensor assembly for weighing the bowl contents, and an alarmed timer to announce periodic feeding times and pre-set feed weight amounts through a speaker. The sensor assembly and timer may be mechanical or electronic and the alarm is both visual and audible. Controls for the pet feeding apparatus can be adapted to be suitable for the blind.

The pet feeding apparatus includes a weighing device and timer to let feed and feeding times be more accurately regulated. The over feeding of pets as well as irregular feeding patterns will lead to a poor diet, obesity and all the inherent health problems that this condition creates. This habit usually starts when the pet is first introduced into a household more often than not as a puppy and usually to act as a companion.

To overcome this problem, the pet feeding apparatus will utilize a normal shaped feeding bowl by adapting it to facilitate a weighing sensor while also incorporating a timer with an audible and visual alarm to alert the owner when a set period of time from the last feed has elapsed. The pet feeding apparatus has the benefit of allowing an adult to entrust a child to safely feed the pet a good practice towards responsibility. It also has the added bonus of giving the poor sighted or even the blind a way to independently and correctly feed their dog. Busy households where there is more than two members will never have to worry about when and who last fed the pet as the alarm/timer will give indications.

The container is set inside a weighing base bowl, denoted as container holder 139. The base assembly has a built in visual display unit 128, such as an LCD display, which incorporates the controls and setting switches. The base assembly is powered by the power compartment which is located underneath the base plate. With the base assembly switched on, the display is illuminated. By moving the slideable operation selector 131 towards the embossed letter F (denoting feed) this will activate the base assembly.

The slideable portion selector 126 proximate to portion symbols 132 gives the option of either self regulating the amount of feed by setting it on the neutral calibration position 133 and using the sensor assembly as a set of scales or by placing the selector under one of the other four embossed symbols: puppy, small dog, medium dog, large dog; when a preset feed portion weight is reached this will activate an alarm. The feed portion being set would be taken from the recommended daily average food allowance specific to each of the above mentioned category of size of dog. The feed weight portion will be displayed in predetermined units on the LCD screen. The predetermined units can be of many different types, such as grams and pounds.

Slideable operation selector 131 is now moved from the embossed letter F to the embossed letter T (denoting timer), any audible alarms that may have been activated during the feed weighing cycle will now be silenced and the LCD screen will show zero.

The next feeding time, anywhere between 0-24 hours, can be set by depressing button 127 on the base assembly the time chosen being displayed on the LCD. Once set countdown to the next feed will start.

For partially or blind people button 127 will be replaced by a dial knob with embossed multiples of hours setting stations (3, 4, 6, 12, 24) to allow for regular feed. When the countdown time has lapsed an audible alarm will sound this will be accompanied by the timer display 128 flashing and also the flashing lights 127 that have been positioned on base body 123a. To silence and reset the alarm simply move Slideable operation selector 131 to the embossed letter F and the whole feeding process starts again.

The container is not physically attached to the base assembly so it can be easily removed for cleaning. The base assembly and container can be manufactured from traditionally used materials, such as steel, ceramics and plastics. The sensor assembly and timing devices can operate in many different ways, such as electrically, mechanically and electromechanically. The container can have two cut-outs opposite each other to act as handles.

It should be noted that the embodiments of the pet feeding apparatuses disclosed herein include electronic circuitry, such as control circuitry, to control the operation of the various functions described above. The electronic circuitry can include memory devices to store information, such as feeding times and the amount of feed provided. The electronic circuitry is controlled in response to activating and deactivating operation button array and portion button array. The electronic circuitry is operatively coupled to the sensor assembly to determine the amount of feed carried by the container.

In FIGS. 1a and 1b, an anti-slip material covers and protects the inner workings of base assembly. The anti-slip material stretches over and sits on the rim of support surface 121.

In FIGS. 2a and 2b, when seated inside the base assembly, the container has a lip that will overhang the rim of the base assembly. This will ensure protection from the outside elements while also providing a leading edge enabling the easy removal of the feeder from the base.

The following paragraph describes another method of operation of the pet feeding apparatus in FIGS. 2a & 2b described above.

On/Off:
 Install 4×1.5 battery. Press 'SET' (FIG. 2c 156f). The bowl will come on and the current time can be set. If user wants to turn off, press and hold 'SET' for 5 seconds, bowl will turn off.

Set Current Time:
 After turning on the bowl, the screen will flash '00:00' use 'HR' (FIG. 2c 156c) and 'MIN' (FIG. 2c 156d) to set current time. Leave finger on either button to scroll through time quicker.
 Press and release 'SET' to store time.

Set Countdown Alarm Time:
 Alarm can be set 1-3 times:
 1: Press and release 'ALM' (FIG. 2c. 156e)—screen will show '00:00'.
 2: Press and hold 'SET' until 'A' logo appears on left side of screen and then release button.
 3: Use 'HR' and 'MIN' to select first alarm time (leave finger on button to scroll through range quicker).
 4: Press and release 'SET' to store.
 Screen will now flash '00.00'. Repeat steps 3-4 if second/third alarm time are required or press 'SET' directly to cancel and skip to next function, no alarm will be set.
 When 'SET' is pressed after third alarm setting the screen will default to showing current time.
 '00.00' is used as an 'OFF' setting sound no alarm will sound when set to this.

Set Desired Weight:
 1: Press and release 'F' (FIG. 2c 156a)-factory pre-set weight will flash on screen, wait till it stops flashing and "0 g" is displayed on screen.
 2: Press 'SET' until factory pre-set weight value starts to flash again and then release.
 3: Use 'HR' and 'Min' buttons to select desired weight OR press button above icon of dog (FIG. 2a 154) to select feed weight that has been pre-set at factory the value of this weight will be displayed on screen.
 Value of four icons: 115 g: 380 g: 590 g: 820 g (from left to right side).
 4: Press 'SET' to store. The screen will now display '0 g'.
 5: Press 'T' (FIG. 2c 156b) to restore screen to displaying current time.

Using:
 When first countdown alarm time is reached the alarm sounds
 (FIG. 3a 129), lights flash (FIG. 2b 127) and the screen displays the desired stored weight.
 Press and release 'F' button to stop both alarms. The screen will continue to flash the desired stored weight for approx 3 seconds more and then display '0 g'.
 Please note '0 g' must be displayed before the bowl can be loaded.
 The bowl can now be loaded with feed; the screen will display the quantity as it is being loaded.
 Both alarms will go off when stored weight level has been reached.
 Press and release 'T' button to silence alarms and re-start countdown timer to next due alarm OR
 To silence alarms and skip feed loading process press 'ALM' button to start countdown to next due alarm time.

Reset Countdown Time:
 1: Press and release 'ALM' button.
 2: Press and hold 'SET' button for 3 seconds; screen will flash next countdown alarm time.
 3: Use 'HR' and 'MIN' to select new time, then press 'SET' to store.
 To keep a particular alarm time and skip onto the next just press 'SET'. After the third alarm has been set the screen will default to current time.
 Please note that when re-setting alarm, even if it is just one alarm time being changed that the user will have to go through the procedure as if changing all three.

Reset Feed Weight:
 1: Press and release 'F' button, the current stored weight will flash on the screen followed by '0 g'. The screen must show '0 g' before moving on to next stage.
 2: Press and hold 'SET' button until current stored weight flashes on the screen again then release 'SET' button.
 3: Use 'Hr' and 'Min' buttons to change and select new weight OR press on a button above icon of dog for pre-set factory feed weight.
 4: Press and release 'SET' button to store new data. The screen will now display '0 g'.
 5: Press 'T' to return screen to displaying current time.

Remarks:
 1: To find out how long till the next feed, press and release 'ALM' button the next due alarm will flash on the screen for approximately 3 seconds then screen will default back to current time.
 2: To find out how much the stored feed weight is press and release 'F' button, the pre-set weight will flash for 3 seconds, then show '0 g'. Press 'T' button to return the screen to displaying current time.
 3: At any time changing moment keeping 'HR' or 'MIN' button pressed will scroll through time range quicker.
 4: When the countdown alarm time has been reached the lights
 (FIG. 2b 127) will flash and the alarm (FIG. 3a 129) sound off, if the 'F' (FIG. 2c 156a) button is not pressed within 5 minutes to conserve battery life the alarm sound will turn off but the lights will continue to flash until the 'F' button is pressed.

The embodiments of the invention described herein are exemplary and numerous modifications, variations and rearrangements can be readily envisioned to achieve substantially equivalent results, all of which are intended to be embraced within the spirit and scope of the invention as defined in the appended claims.

The invention claimed is:

1. A pet feeding apparatus, comprising: a container; a base assembly, which includes a sensor assembly operatively coupled to a portion keypad circuit board and operation keypad circuit board, the base assembly including an annular sidewall, and an upwardly facing base opening sized and shaped to receive the container, wherein the annular sidewall includes an upper annular lip which bounds the base opening; wherein the base assembly includes a panel which extends through the annular sidewall below the upper annular lip; the panel includes an operation selector with a feed setting and a timer setting and a portion selector directly adjacent at least two portion symbols corresponding to at least two pet portion sizes that are recommended amounts of food to be given to a pet of a given size; wherein the panel displays the amount of food carried by the container and provides an indication of the feeding time; wherein feed and feeding times are accurately regulated to reduce over feeding and irregular feeding patterns.

2. The apparatus of claim 1, wherein the amount of food carried by the container is determined in response to setting a portion selector.

3. The apparatus of claim 1, wherein the indication of the feeding time is determined in response to setting an operation selector.

4. The apparatus of claim 1, wherein the sensor assembly carries the container, and provides an indication of the amount of food carried by the container.

5. The apparatus of claim 1, wherein the base assembly includes a light which is activated and deactivated in response to the indication of the feeding time.

6. The apparatus of claim 1, wherein the base assembly includes an alarm which is activated and deactivated in response to the indication of the feeding time.

7. The apparatus of claim 6, wherein the base assembly provides a sound in response to the alarm being activated.

8. The apparatus of claim 7, wherein the base assembly terminates the sound in response to the alarm being deactivated.

9. The apparatus of claim 1, wherein the base assembly includes a light which is activated and deactivated in response to the alarm being activated and deactivated, respectively.

10. The apparatus of claim 1, wherein the base assembly stores the amount of time between feeding times.

11. The apparatus of claim 1, wherein the base assembly provides a sound in response to the indication of the feeding time.

12. The apparatus of claim 1, wherein the base assembly includes an alarm which is activated in response to the amount of food being driven to a predetermined amount of food.

13. The apparatus of claim 1, wherein the base assembly includes a light which is activated in response to the amount of food being driven to a predetermined amount of food.

14. The apparatus of claim 1, wherein the base assembly provides a sound in response to the amount of food being driven to a predetermined amount of food.

15. The apparatus of claim 1, wherein the portion keypad circuit board and operation keypad circuit board extend through the annular sidewall.

16. The apparatus of claim 15, further including a base plate coupled to the base body opposed to the upwardly facing base opening, wherein the panel is between the base plate and upper annular lip.

17. The apparatus of claim 16, wherein the sensor assembly is carried by the base plate, and the container is carried by the sensor assembly.

18. The apparatus of claim 15, further including a base plate coupled to the base body opposed to the annular sidewall, wherein the sensor assembly is carried by the base plate, and the container is carried by the sensor assembly.

* * * * *